US012669100B2

(12) United States Patent
Seidl et al.

(10) Patent No.: US 12,669,100 B2
(45) Date of Patent: Jun. 30, 2026

(54) INJECTOR FOR INJECTING FUEL

(71) Applicant: LIEBHERR-COMPONENTS DEGGENDORF GMBH, Deggendorf (DE)

(72) Inventors: Martin Seidl, Deggendorf (DE); Richard Pirkl, Regensburg (DE); Razvan-Sorin Stinghe, Hengersberg (DE); Martin Schmidt, Regensburg (DE); Lydia Kapusta, Poysbrunn (DE)

(73) Assignee: LIEBHERR-COMPONENTS DEGGENDORF GMBH, Deggendorf (DE)

( * ) Notice: Subject to any disclaimer, the term of this patent is extended or adjusted under 35 U.S.C. 154(b) by 69 days.

(21) Appl. No.: 18/720,549

(22) PCT Filed: Dec. 13, 2022

(86) PCT No.: PCT/EP2022/085529
§ 371 (c)(1),
(2) Date: Jun. 14, 2024

(87) PCT Pub. No.: WO2023/110821
PCT Pub. Date: Jun. 22, 2023

(65) Prior Publication Data

US 2025/0052215 A1 Feb. 13, 2025

(30) Foreign Application Priority Data

Dec. 15, 2021 (DE) ..................... 10 2021 133 250.8

(51) Int. Cl.
*F02M 47/02* (2006.01)
*F02M 21/02* (2006.01)
*F02M 61/18* (2006.01)

(52) U.S. Cl.
CPC ...... *F02M 21/0257* (2013.01); *F02M 47/027* (2013.01); *F02M 61/1853* (2013.01); *F02M 2200/306* (2013.01)

(58) Field of Classification Search
CPC ........... F02M 21/0257; F02M 21/0242; F02M 21/0266; F02M 21/0275; F02M 21/0293;
(Continued)

(56) References Cited

U.S. PATENT DOCUMENTS

2018/0030969 A1* 2/2018 Nong ..................... F02M 51/04
2018/0066620 A1* 3/2018 Nagaoka ............. F02M 61/162

FOREIGN PATENT DOCUMENTS

CN 107842453 A 3/2018
DE 102013202605 A1 8/2014
(Continued)

OTHER PUBLICATIONS

Machine translation, detailed description of CN107842453A, Greiner, obtained from https://worldwide.espacenet.com/, pp. 1-2.*
(Continued)

*Primary Examiner* — Grant Moubry
(74) *Attorney, Agent, or Firm* — McCoy Russell LLP

(57) ABSTRACT

The invention relates to an injector for injecting fuel, preferably for injecting a gaseous fuel, in particular hydrogen, comprising a fuel supply line for introducing a highly pressurized gaseous fuel, an active valve which can be actively shut off and which is designed to close or release at least one passage on a first face of a valve plate in order to selectively release or interrupt a fluidic connection between the fuel supply line and a region which is downstream of the first face of the valve plate, and a passive valve which is arranged downstream of the valve plate and can be passively
(Continued)

switched to a closing or releasing state as a result of different pressure ratios upstream and downstream of the passive valve.

16 Claims, 7 Drawing Sheets

(58) Field of Classification Search
CPC ............. F02M 21/0206; F02M 47/027; F02M 61/1853; F02M 61/1886; F02M 63/0054; F02M 2200/306; Y02T 10/30
See application file for complete search history.

(56) References Cited

FOREIGN PATENT DOCUMENTS

| | | | |
|---|---|---|---|
| DE | 102014224341 | A1 | 6/2016 |
| WO | 2022073886 | A1 | 4/2022 |

OTHER PUBLICATIONS

ISA European Patent Office, International Search Report Issued in Application No. PCT/EP2022/085529, Apr. 13, 2023, WIPO, 4 pages.

* cited by examiner

INJECTOR FOR INJECTING FUEL

CROSS REFERENCE TO RELATED APPLICATIONS

The present application is a U.S. National Phase of International Application No. PCT/EP2022/085529 entitled "INJECTOR FOR INJECTING FUEL," and filed on Dec. 13, 2022. International Application No. PCT/EP2022/085529 claims priority to German Patent Application No. 10 2021 133 250.8 filed on Dec. 15, 2021. The entire contents of each of the above-listed applications are hereby incorporated by reference for all purposes.

TECHNICAL FIELD

The present invention relates to an injector for injecting fuel, in particular for blowing in a gas, preferably for directly blowing in hydrogen. In this case, it can be provided that the injector is designed to inject fuel into a combustion chamber of an internal combustion engine.

BACKGROUND AND SUMMARY

In the course globally ever stricter exhaust gas limit values, and ambitious climate protection aims, the demands on internal combustion engines in terms of environmental technology are continuously increasing. The aim is for low-emission or even emission-free drive technologies in the foreseeable future, which also comply with the strictest exhaust gas limit values and make a significant contribution to achieving the climate protection aims. In the case of technologies which operate with combustion, these aims can be achieved only when using climate-neutral, renewable fuels, which do not result in any emissions at all, along the entire value chain (known as "zero-emissions" fuels).

Using currently conventional petrol, diesel and gas engines, the requirements of zero-emission combustion cannot be achieved, even using what are known as E-fuels, for example a synthetically produced OME fuel, the production of which requires merely renewable energy, since the emission of harmful exhaust gases such as nitrogen oxides ($NO_x$), unburned hydrocarbons (UHC) and soot cannot be completely reduced using current technologies.

In principle, battery-operated drives fulfil the zero-emissions guidelines during operation, and are on the rise in particular in the passenger car domain. If, in contrast, the entire value chain is considered, however, the production of the (lithium) batteries is very costly in terms of energy, and problematic from perspectives of environmental technology, since in particular significant environmental damage occurs during resource mining, and mining of the raw materials required for the batteries cannot be performed sustainably. Furthermore, the power-to-weight ratio of batteries that can be achieved today does not allow for use in machines having a high (peak) power requirement.

Fuel cell-operated drives having a supply of renewable hydrogen meet the specified climate protection aims and are used to a very limited extent even today. However, this concept also has some disadvantages, for example a low peak power and low efficiency compared with current diesel drives.

Therefore, hydrogen internal combustion engines have come into focus, which are a promising drive alternative. However, hitherto these exist only in very small numbers or as prototypes having a low degree of maturity. A hydrogen produced by renewable energies would meet all the requirements of "zero emission", since this can be combusted in an emission-free manner.

Thus, in the passenger car domain for example hydrogen engines exist having external mixture formation (PFI=port fuel injection), in which the fuel is already thoroughly mixed with air, for sufficient time, before entering the combustion chamber. Hydrogen motors in which the fuel is directly blown into the combustion chamber (inner mixture formation, DI=direct injection) play virtually no role today, but exhibit inter alia higher efficiency, more stable combustion, and elimination of the risk of backfiring in the intake portion, compared with the PFI concept.

In the case of direct injection hydrogen engines, typically a distinction is still made with respect to the maximum injection pressure in the injector (<60 bar: low pressure, >60 bar: high pressure), wherein the limits are not clearly set, and the transitions are fluid. Higher pressures offer the possibility of a reduced blow-in duration in a later phase of the compression in the case of higher combustion chamber pressures, which results in an increased efficiency and improved combustion stability. However, the overall efficiency reduces if compression of the hydrogen is not necessary beforehand.

If the hydrogen is obtained 100% from renewable energies, virtually climate-neutral operation can be achieved using hydrogen internal combustion engines. Furthermore, there are a number of further advantages:

- use of known technologies with a high level of maturity and existing production facilities
- unlimited availability of the hydrogen by electrolysis of water
- use of the existing filling station system possible (after corresponding retrofitting) with quick filling times
- (virtually) emission-free conversion of the hydrogen possible in the combustion, because $CO_2$-neutral, only minimal CO, UHC, particle and soot emissions (caused only by lubricants in the intake system, under the measuring limit) and only minimal $NO_x$ emissions by suitable combustion methods (optionally with exhaust gas recycling, SCR catalyst)
- significantly lower requirement of purity of the hydrogen compared with fuel cell drives
- no need for platinum for production, as in the case of fuel cells.

In addition to these numerous advantages with respect to other drive concepts, however, some challenges also exist, which must be overcome in the development of hydrogen internal combustion engines:

- low molecular weight of hydrogen, and thus a low density associated with a low volumetric energy density (in the case of high mass-specific energy density); see Table 1
- provision of a consequently high volume flow when blowing in hydrogen
- corresponding provision of large flow cross-sections in the injector and significantly greater strokes of the actuator, required by this, than in the case of conventional drive types
- associated development of a significantly more powerful actuator unit with simultaneously limited installation space
- tightness of the overall system/prevention of external leaks, in particular in view of safety aspects (fire and explosion risk on account of hydrogen escaping from the system)

increased risk of wear on guides of moving components on account of the virtually non-existent lubricant effect of hydrogen significantly greater tendency of moving components to bounce on mechanical stops in gas injectors compared with injectors comprising liquid fuels due to low damping effect in the case of the gas compression material resistance to hydrogen necessary in view of the risk of hydrogen embrittlement in components that are mechanically stressed/subjected to pressure (reduced strength) or by chemical reaction of the hydrogen with oxygen present in the copper coil of the actuator (hydrogen brittleness of the copper)

mixture preparation in the combustion chamber/influencing of the blow-in jet/ignition behavior in the case of blowing in of very small amounts

TABLE 1

Mass-specific and volume-specific calorific value of diesel and hydrogen

| | Diesel | Hydrogen (at 25° C.) |
|---|---|---|
| Calorific value in MJ/kg | 43.0 | 120.0 |
| Calorific value in MJ/m$^3$ | 35,819 | 9.8 at 1 bar<br>287.7 at 30 bar<br>2464.4 at 300 bar |

The aim of the present invention is that of at least in part overcoming or lessening the disadvantages set out above. Furthermore, it is advantageous if the injector occupies only a small installation space and/or has a small axial length. In particular, in this case, a fuel injector should be provided which allows for reliable operation even in the case of high thermal loading. Furthermore, it is advantageous if the injector is reliably sealed against the pressure in the cylinder during its compression phase, since the high cylinder pressure would otherwise push the switchable valve into the open position. It is furthermore advantageous if quick and stable opening is possible with the injector, in which no throttling of the flow takes place. At least some or all of the above-mentioned aims are achieved with an injector for injecting fuel having all the features of claim 1. In this case, advantageous embodiments are specified in the dependent claims.

An injector according to the invention for injecting fuel, preferably for blowing in a gaseous fuel, in particular hydrogen, comprises a fuel supply line for introducing a gaseous fuel under high pressure, an active valve which is actively switchable and is designed to close or release at least one passage on a first side of a valve plate, in order to selectively release or interrupt a flow connection from the fuel supply line to a region downstream of the first side of the valve plate, and a passive valve which is arranged downstream of the valve plate and is switchable into a closing or releasing state by different pressure ratios prevailing upstream and downstream of the passive valve. The injector is characterized in that the passive valve is designed to close or release the at least one passage of the valve plate on a second side of the valve plate facing away from the first side with a tappet, in order to selectively release or interrupt a flow connection from the second side of the valve plate to a region downstream of the passive valve.

The fact that the tappet of the passive valve attaches directly to the second side (for example the underside) of the valve plate results in a particularly space-saving design of an injector. Typically, in the prior art, for implementing the passive valve a further sealing surface was provided, which is arranged downstream of the valve plate, which necessarily leads to an axial enlargement of the injector. The fact that now, according to the invention, the first side of the valve plate can be sealed by the actively switchable armature, and the side of the valve plate facing away therefrom can be sealed by the tappet of the passive valve, results in a particularly space-saving design of an injector, which is compact in the longitudinal direction and reduces the necessary installation space.

A further advantage of the invention is also that undesired raising of the armature from the valve plate owing to pressure peaks or a very high pressure level, which spreads for example during a compression phase of the cylinder or during combustion, from the combustion chamber in the direction of the valve plate, leads to the tappet of the passive valve being thrust against the valve plate in its closed position. Accordingly, the passive valve ensures sealing of the valve and needle space against the cylinder pressure. As a result, the spring force, by which the armature must be thrust onto the valve plate, in a closed position, for secure sealing, can also be reduced, which has a further advantageous effect on the dimensioning and the costs of the injector.

Furthermore, in the case of the implementation according to the invention there is only a very small volume of fuel, which can be located in the intermediate region of the active valve and passive valve. Thus, if a negative pressure occurs downstream of the passive valve (for example in an expansion phase or also in a suction phase of a cylinder), which leads to the tappet of the passive valve being raised from the valve plate, only a very small volume of fuel flows out, which fuel enters an exhaust gas tract of an engine, possibly without being combusted. This results in the output of the fuel being improved, with respect to efficient use, since the output timepoint can be controlled more reliably and very much less fuel is output undesirably, even in the case of a negative pressure that opens the passive valve.

In this case, according to a further optional development of the invention it can be provided that, in a closed state of the passive valve, the tappet of the passive valve, which tappet is movable back and forth, is in contact with the second side of the valve plate, in order to seal the at least one passage of the valve plate. In this case, the tappet, which is movable back and forth, contacts the second side (underside) of the valve plate in a closed position, and thus seals the at least one passage, penetrating the valve plate, from the second side.

In this case, it can preferably be provided that, in a closed state of the passive valve, the tappet is directly in contact with the second side of the valve plate, or is indirectly in contact therewith, via an intermediate element.

According to an advantageous modification of the present invention, it can be provided that, in a closed state of the active valve, an armature of the active valve that is movable back and forth in the longitudinal direction of the injector is in contact with the first side of the valve plate, in order to seal the at least one passage of the valve plate from the first side, preferably wherein the injector further comprises a coil which is designed to move the armature out of its closed position, by means of magnetic force.

In this case, on the first side (for example an upper side) of the valve plate the at least one passage of the valve plate is selectively closed or released, typically by means of an armature that can be raised out of a closed position by a coil. In a closed position, the armature seals the at least one passage of the valve plate, such that a fluid flow, guided through the valve plate, along the valve plate, is prevented. In this case, a coil can optionally be provided, which generates a magnetic field when energized, which leads to raising of the armature, such that the at least one passage is released.

In this case, it can preferably be provided that, in a closed state of the active valve, the armature is directly in contact with the first side of the valve plate, or indirectly in contact therewith via an intermediate element. In this case, the intermediate element can be a sealing element, which peripherally surrounds the opening contour or entirely covers it and is arranged for example on the end face of the valve plate facing the armature. Alternatively, or in addition, however, it is also conceivable for the sealing element to be arranged on an end face of the armature facing the valve plate, or to be arranged so as to be freely movable between the valve plate and the armature.

According to an optional development of the present invention, it can be provided for the stop of the tappet, which contacts the valve plate, to be designed as a flat seal, sealing cone and/or ball seal. It is clear to a person skilled in the art that a plurality of possible contact pairings can lead to a desired sealing effect. However, the flat seal is particularly advantageous, since in the case of an opening process, in which the tappet is pushed away from the valve plate, out of a closing position, the fuel flow arising from the fuel supply line directly strikes a flat plate, such that this results in a high back pressure and high compressive forces act, which quickly and reliably open the tappet.

According to an optional development of the invention, it can be provided that the injector further comprises a pushing device, which is designed to push the tappet of the passive valve towards the valve plate, into the closed position.

In this case, it can advantageously be provided that the pushing device comprises a spring element, in particular wherein the spring element is a helical spring. In this case, the spring element can support an immovable counter stop, which simultaneously also has the task of limiting the maximum stroke of the tappet. In this case, the counter stop thus defines the maximum distance that the tappet can assume from the valve plate.

In this case, according to a further development of the invention it can be provided that the counter stop, on which the spring element is supported, is opened only towards the valve plate and is otherwise closed in a fluid-tight manner. In this case, it can be provided that the counter stop comprises a first portion that extends radially to the longitudinal direction of the injector, and a second portion which adjoins said first portion and extends in parallel with the longitudinal direction of the injector, and which is preferably arranged coaxially to the blow-in pipe. The end of a spring element remote from the valve plate, in particular the end of a helical spring remote from the valve plate, can be inserted into this pocket-like design of the counter stop, having a circular shape. An advantage of this is that, in the case of a maximum deflection of the tappet, in which said tappet contacts the counter stop, the flow of the gaseous fuel does not interact with the spring element, and thus no undesired turbulence occurs. The spring element is thus isolated from the flow path of the gaseous fuel and cannot negatively influence this. In this case, it is advantageously provided that the opening contour of the tappet is arranged only in a region which is located in the interior of the circular contour (viewed in cross-section) when placed on the counter stop, which is circular in the cross-section of the contact region with the tappet.

According to a further advantageous modification of the present invention, it can be provided that an intermediate element is arranged between the tappet and the valve plate, which element, in a closed position of the passive valve, is contacted on a first side by the tappet and on an opposite side by the valve plate.

In this case, the intermediate element can be designed as a sealing element and can surround or cover an opening contour of the valve plate on the end face that faces the tappet. Thus, if the tappet and valve plate are guided towards one another, then the intermediate element, designed as a sealing element, together with the tappet, fluidically seals the at least one passage through the valve plate.

In this case, it can also be provided that the intermediate element is made of a flexible material, in particular an elastomer, in order to reduce bouncing of the tappet in the case of impact on the valve plate. Thus, in addition to an advantageous sealing effect, the problem that results in bouncing of the tappet on the valve plate is also reduced. If the intermediate element is made from a flexible material or comprises said flexible material, then the impact is damped in the case of a contacting tappet with the valve plate, such that a reduction in the bouncing occurs.

Furthermore, it can advantageously be provided, according to the invention, that the intermediate element is made of a thermally insulating material, in particular comprises a ceramic material or is made of a ceramic. If the intermediate element has thermally insulating properties, this leads to components arranged upstream being shielded from the high temperatures typically occurring in the case of combustion of fuel. It is then possible to use components which are specified in a low temperature range and as a result can consist of low-cost materials and allow for an overall more cost-effective injector.

According to an optional development of the present invention, it can be provided that the intermediate element is or comprises a coating arranged on the end face of the tappet facing the valve plate, and/or comprises or is a coating arranged on the end face of the valve plate facing the tappet. The intermediate element does not necessarily have to be designed as a separate disc or foil, but rather can also be implemented by a coating that is arranged either on the tappet and/or on the valve plate. This is advantageous with respect to the manufacture of the injector, since in the case of a coating on the tappet and/or the valve plate fewer components have to be assembled manually or in an automated manner when manufacturing the injector.

Furthermore, according to an advantageous design of the present invention it can be provided that the intermediate element is fastened on the tappet and/or the valve plate or is arranged so as to be freely movable between the tappet and the valve plate. Thus, for example, an implementation of the intermediate element as a washer or spacer collar is conceivable, which washer or collar is also inserted and guided in the tappet guide portion that peripherally surrounds the tappet. This implementation is advantageous in particular with respect to future maintenance costs, since it is to be expected that the intermediate element is subject to a particularly large amount of wear. If this is the case, a worn disc can simply be removed and replaced by a mint-condition disc, such that the original tappet, as well as the original valve plate, can be re-used.

According to an advantageous embodiment, it can furthermore be provided, according to the invention, that a counter stop that limits the maximum stroke of the tappet from the valve plate is provided, which counter stop is preferably provided with at least one damping element, in order to damp an impact of the tappet and reduce bouncing. The damping element used in this case can consist of a flexible material or comprise such a material and is in particular produced from an elastomer.

According to the invention, it can further be provided that the tappet of the passive valve has an opening contour through which the gaseous fuel originating from the fuel supply line flows downstream. It can preferably be provided, according to an optional development of the invention, that the opening contour is implemented by a single drilled hole, preferably a single central drilled hole in the tappet. It can furthermore be provided that, in a completely open position of the passive valve, in which the tappet is thus maximally spaced apart from the valve plate, the opening contour is the single connection for the gaseous fuel, via which a downstream flow can occur. For example, this is implemented when the counter stop is designed continuously on the inner periphery of the blow-in pipe, such that a flow of a fluid in the connection region from the counter stop and the blow-in pipe surrounding the counter stop is not present.

The invention further relates to an internal combustion engine having fuel injection, in particular having direct gas injection, in particular having direct hydrogen injection, comprising an injector according to any of the preceding claims 1-14.

BRIEF DESCRIPTION OF THE FIGURES

Further features, details and advantages of the invention will become clear on the basis of the following description of the figures, in which.

DETAILED DESCRIPTION

Figure 1:
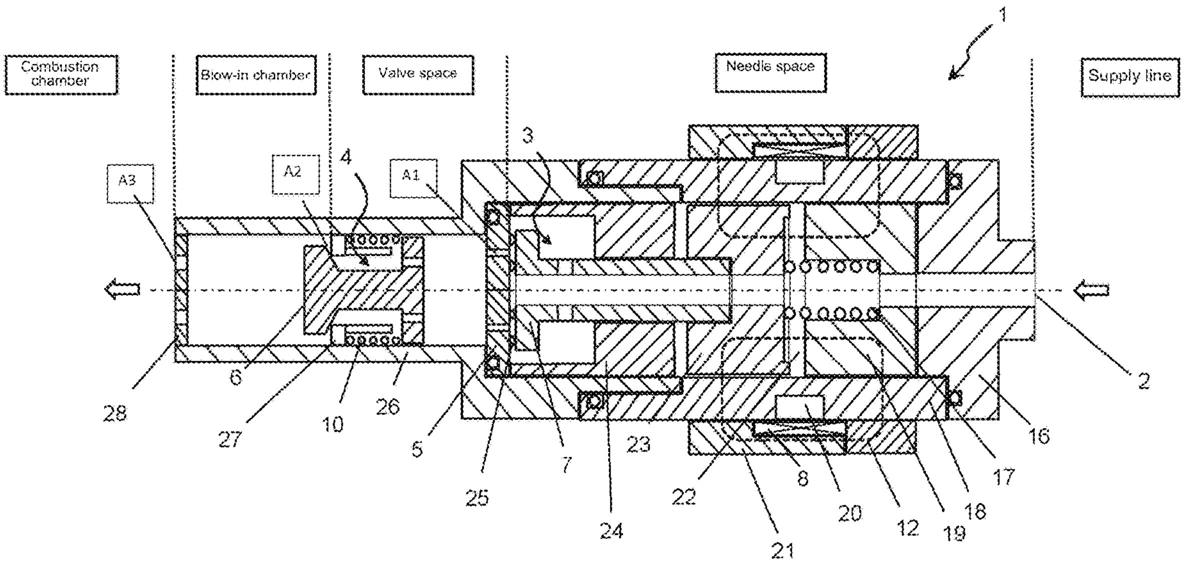
FIG. 1: is a schematic sectional view of an injector according to the prior art.

The following detailed figure description of FIG. 1 is explained on the basis of an injector for blowing in a gaseous fuel, wherein it is clear to a person skilled in the art, however, that the invention also comprises an injector for injecting another fuel.

In this case, FIG. 1 is a longitudinal sectional view of an injector 1 for blowing a gaseous fuel, for example hydrogen, into a combustion chamber. In this case, the injector 1 has an injector housing in which different components of the injector 1 are located. On the connection side, a fuel supply line 2 for introducing a fuel into the injector 1 is provided. Initially, in this case, the fuel or another combustible fluid (for example a hydrogen) is conducted through a drilled hole of a cover 16, extending approximately centrally in the injector housing, and subsequently through a fluid channel of an armature mating piece 19, a through-opening of the armature base 23, and a hollow interior of the armature 7, which is sometimes also referred to as a hollow needle or simply just needle, to the end of the armature 7 remote from the connection side.

Depending on the position of the armature 7 relative to the valve plate 5, the openings A1 penetrating the valve plate 5 are closed or released. In the state shown in FIG. 1, the passages A1 are close by pressing the armature 7 against the valve plate 5, since the end face of the armature 7 covers the opening contours of the passages A1. In order to improve the tightness, sealing elements 25 can be provided, which extend around the opening contours of the passages A1 and, in a sealed state, contact the end face of the armature 7. If the passages A1 are closed by the end face of the armature 7, the fluid flow of the fuel is stopped at this point of the injector 1, and there is no downstream flow of fuel on the other side of the valve plate 5.

If, in contrast, the passages A1 are released, which is implemented by raising the armature 7 away from the valve plate 5, the fuel, introduced into the injector 1 at a certain pressure, flows out and escapes on the side of the valve plate 5 spaced apart from the armature 7, via the plurality of passages A1. After flowing through a passive valve 4, which is provided in the injector 1, the pressurized fuel flows out of the injector, through the blow-in cap 28. After flowing through the blow-in cap 28, the fuel output via the injector 1 is then typically located outside the injector 1, in a combustion chamber. Furthermore, compression of the fuel typically takes place in the combustion chamber, where the fuel then ignites or is ignited.

The passive valve 4, which is located on the side of the valve plate 5 remote from the armature 7, serves to keep a very high pressure, prevailing in the combustion chamber, away from the armature 7. Otherwise, it could be the case that the very high pressure prevailing in the combustion chamber acts on the armature 7 and moves it away, out of its position closing the at least one passage A1. In the following work step of the injector 1, the fuel required for the combustion would then no longer be introduced into the combustion chamber, but rather a mixture that is already combusted at least in part, which can lead to an interruption of the combustion process or, at best, to a lower power of the combustion process.

In this case, the passive valve 4 comprises a valve tappet 6, a valve guide 27, and a valve spring 10 which pushes the valve tappet 6 into a closed position, such that an outflow of fuel via the opening contour A2 of the passive valve 4 occurs only when a pressure prevails on the side of the passive valve 4 facing the valve plate 5 which is greater, at least by the restoring force of the valve tappet 6 exerted by the valve spring 10, than the pressure prevailing on the side facing away from the passive valve 4 towards the valve plate 5. An inflow of a fluid from the side of the passive valve 4 facing the combustion chamber is thereby prevented.

Deviating from the illustrative drawings, it can be provided that the opening contour is implemented by a single drilled hole, preferably a single central drilled hole, through which the flow of the gaseous fuel is guided the passive valve. Providing just one drilled hole in the passive valve can be advantageous with respect to the necessary production costs of the passive valve and any occurring turbulence during flow guidance.

The armature 7 is movable back and forth in the longitudinal direction of the injector 1. In this case, the movement of the armature 7, which can be formed in one piece or can consist of an armature base 23 and an armature tip (also referred to as needle or hollow needle), is controlled via an active valve 3, which, in the present illustration of FIG. 1, is a solenoid valve. In this case, the armature 7 is designed such that it reacts to the magnetic force generated by a coil 8. In this case, current can selectively flow through the coil 8, such that the magnetic force resulting in the process moves the armature 7 in the direction of the fuel connection 2. This movement results in the armature 7 being raised relative to the valve plate 5. As a result, the passages A1 in the valve plate 5 are released, such that fuel can flow through the valve plate 5.

For precise guidance of the armature 7 along the longitudinal axis of the injector or an armature guide 24 can be provided, which peripherally surrounds an outside of the armature 7.

An air gap 22 is provided between the armature 7 and the armature mating piece 19, which gap is closed or reduced when the coil 8 is energized.

In order to improve the magnetic flux when the active valve 3 is implemented as a solenoid valve, the coil 8 can be surrounded, on its peripheral outside, by a magnetic yoke 21, in which the magnetic field can propagate particularly well. The situation is similar in the case of the housing component that directly surrounds the armature element 5 and the armature mating piece 27, which housing component likewise preferably consists of a magnetizable material. It may thus be advantageous if the pole tube 18, which is a component of the injector housing 2, is also made of iron or another ferromagnetic material. The same also applies of the armature mating piece 19 which advantageously also consists of a magnetizable material.

A visualized illustration of the magnetic field lines 12 is illustrated in each case by a dotted, closed line, which extends around the coil in a circular manner. The magnetic force pulls the armature element 7 (together with the armature base 23) towards the armature mating piece 19 and thus is raised from the valve plate 5 or from the passages A1 penetrating the valve plate 5, such that an inflow of fuel to the passive valve can occur, from where fuel is ultimately introduced into the combustion chamber, via the blow-in cap 28.

Figure 2:
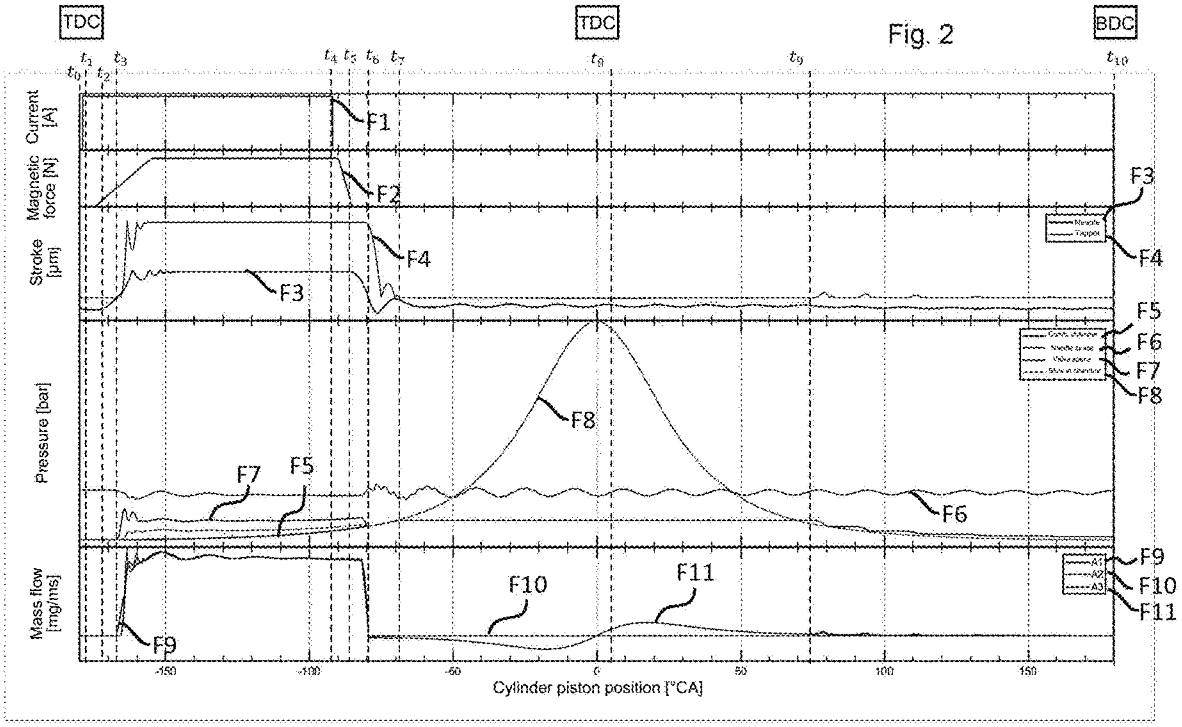
FIG. 2: shows various states of components and pressures in an injector.

FIG. 2 shows the fundamental behavior of the injector 1 during blowing in. In the starting position, at the timepoint to at the lower dead center (UT) of the cylinder piston, the armature 7 and valve tappet 6 are pushed into their respective stop by the pretensioned armature spring 17 or passive valve spring 10 and close the throttle points A1 and A2 which connect the needle space with the valve space, and the valve space with the blow-in chamber, respectively, in the open state of the armature 7 or valve tappet 6. The pressure in the injector 1 corresponds to the pressure in the supply line, and the pressure in the combustion chamber and in the blow-in chamber corresponds to the boost pressure during the suction phase of the cylinder piston, in which fresh air is suctioned into the combustion chamber via the inlet valves. The pressure in the valve space corresponds approximately to the combustion chamber pressure, and depends inter alia on the armature spring 17, the pressure in the combustion chamber during the phase of emission of the hot combustion gases via the outlet valves of the combustion chamber, and possibly preceding blowing-in. The functional representation below is simplified and does not take into account the load alternation by opening and closing the inlet and outlet valves of the combustion chamber.

At the timepoint $t_1$, the actuator device applies a voltage signal to the coil 8 of the actuator via the electrical contacts, such that the current F1 in the electrical circuit rises to a defined final level. The coil 8 through which current flows induces a magnetic field 12 in the actuator, the magnetic field lines of which propagate toroidally around the coil (see FIG. 1). The magnetic field 12 builds up a magnetic force F2 in the air gap between the armature 7 and the armature mating piece 19, as a result of which, at the timepoint 12, the armature 7 is drawn to the armature mating piece 19, as soon as the magnetic force F2 exceeds the closing force (sum of the preload force of the armature spring 17 and the compressive forces on the armature 7). In this case, the building up of the magnetic field, and thus the magnetic force F2, is delayed by eddy currents in the iron parts of the magnetic circuit. The armature 7 is integrally or rigidly connected to the armature base 23, such that the armature 7 moves uniformly with the armature stroke (or also: needle stroke) F3. As soon as the sealing element 25 on the valve plate 5 at the timepoint 13 is no longer in contact with the end face of the armature 7, the connection between the needle space and the valve space is released, such that the fuel flows from the needle space into the valve space. As a result, the pressure in the valve space increases. As soon as the pressure difference between the valve space and the blow-in chamber corresponds to a force difference on the valve tappet 6 of the same magnitude as the preload force of the valve spring 10, the passive valve 4 opens, i.e. the valve tappet 6 moves away from the seat along a valve tappet stroke F4 and releases the connection between the valve space and the blow-in chamber, such that fuel flows from the valve space into the blow-in chamber. This results in a pressure increase in the blow-in chamber (cf. F8: pressure in the blow-in chamber). The fuel flows further, downstream, through the opening(s) A3 in the blow-in cap 28 into the combustion chamber. In this case the blow-in cap 28 is designed such that the flow can be introduced into the combustion chamber in a defined state (jet orientation, inflow momentum, jet pattern, etc.). The open state of the armature 7 and valve tappet 6 is maintained during the entire remaining energization phase. The current level can be reduced (e.g. by a PWM voltage signal) as soon as the armature 7 is fully open and possible bouncing does not lead to closing of the armature 7. During blowing in, the cylinder of the engine is in the compression phase, such that the combustion chamber pressure F5 rises continually.

In order to end the blow-in procedure, the voltage supply is ended by the controller, such that the current F1 through the coil 8 is reduced to zero (timepoint $t_4$). On account of the eddy currents the magnetic force F2 also reduces, in a temporally delayed manner. As soon as the magnetic force F2 is lower than the sum of the closing force of the armature spring 17 and the hydraulic forces on the armature 7, the armature 7 begins to close uniformly (timepoint $t_5$); cf. also F3, F4. If the end face of the armature 7 strikes the sealing element 25 of the valve plate 5, then the connection between the needle space and the valve space is separated and the fuel flow from the needle space into the valve space is interrupted (timepoint $t_6$). As a result, the pressure in the valve space F7 reduces. When the pressure difference between the valve space F7 and the blow-in chamber F8 corresponds to a force difference on the valve tappet 6 of the same magnitude as the valve spring force, the valve tappet 6 moves back into its closed position on the valve seat 27 and is pressed against the seat 27 by the increasing pressure F5 in the combustion chamber and thus in the blow-in chamber, such that the fuel connection between the valve space and the blow-in chamber (optionally after a phase of bouncing of the tappet on the valve seat 27) is interrupted (timepoints $t_6$-$t_7$). The blow-in procedure is thus concluded. During the further compression phase of the combustion chamber, up to the upper dead center (OT) in the time period $t_7$-$t_8$, the air/fuel mixture is compressed in the blow-in chamber, while it relaxes in the subsequent expansion phase (time period $t_8$-$t_9$), wherein the further interim increase in the combustion chamber pressure F5 on account of combustion is not shown here, for the sake of simplicity. If the pressure in the combustion chamber drops to such an extent that the difference between compressive forces on the valve tappet 6 corresponds to the preload force of the armature spring 17 (timepoint $t_9$), then the valve tappet 6 opens again briefly, such that a portion of the fuel present in the valve space escapes into the combustion chamber. This procedure is dependent on the spring fore and can occur repeatedly (time period $t_9$-$t_{10}$).

In this case, the respective mass flow of the fuel via the passages A1 of the valve plate 5, the passages A2 of the tappet 6, and the and the passages A3 of the blow-in cap 28 is indicated by F9, F10 and F11, respectively.

Figure 3:
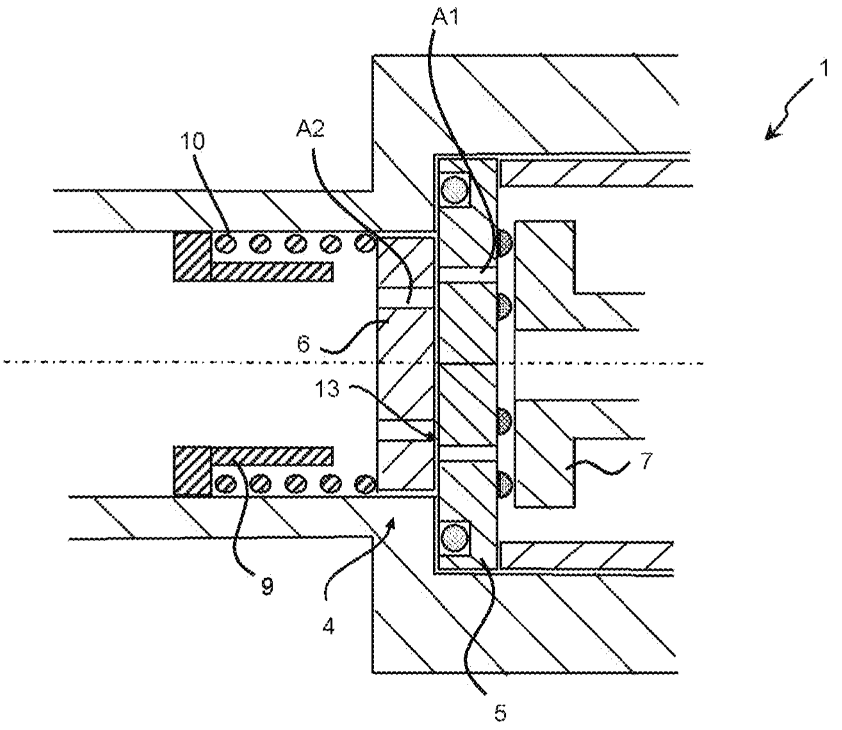
FIG. 3: is a schematic partial sectional view of an injector according to the invention in the region of the valve plate.

FIG. 3 is a partial sectional view of an injector 1 according to the present invention, focusing on the passive valve 4 and the valve plate 5. It can be seen that the tappet 6 of the passive valve 4 is provided on an underside of the valve plate 5 and seals the passages A1 provided in the valve plate 5 by direct contact. In this case, on the other side of the valve plate 5, depending on the position of the armature 7 (or also: armature needle or simply needle) the at least one passage A1 is also selectively closed or released by the valve plate 5. Since the valve plate 5 can into contact from two sides with respective valve inserts, specifically the tappet 6 and the armature 7, a two-sided valve is disclosed which is opened only when both valve inserts (tappet 6 and armature 7) are in the open position. It can thus be seen that one end of the at least one passage A1 can be closed by the armature 7, and the other end of the at least one passage A1 can be closed by the tappet 6. In this case, the closing forces of the two valve inserts act antiparallel to one another, such that a force for raising a respective valve insert (armature 7 and tappet 6) must in each case be directed away from the valve plate 5.

In this case, the tappet 6 is pushed into its closed position by a spring element 10, wherein the spring element 10 is supported on a mating stop arranged downstream, which is rigidly arranged in the injector 1. It can furthermore be seen that the seal, implemented by the tappet 6, on the underside of the valve plate 5 is a flat seal or a flat seat 13.

The armature 7 is also pushed towards the valve plate 5 with a certain force, which is typically exerted via an armature spring 17. In this case, the force exerted by the armature spring 17 on the armature 7 acts in the opposite direction from the force which is exerted by the spring element for pushing the tappet 6 into its closed position.

In this case, the configuration shown, having direct sealing on the underside of the valve plate 5, is very space-saving and allows for injectors 1 that are very short in the longitudinal direction.

Figure 4A:
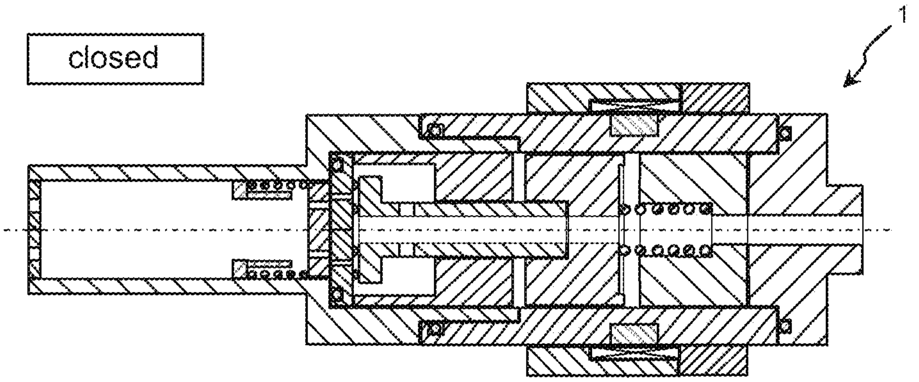
FIG. 4*a-b*: are schematic sectional views of the injector according to the invention in a closed and an open state.
Figure 4B:
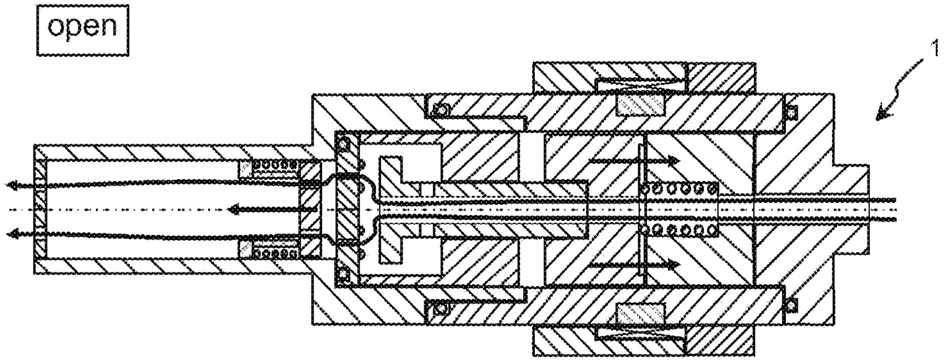

In this case, FIG. 4*a* and FIG. 4*b* show a closed state (FIG. 4*a*) and an open state (FIG. 4*b*) of the injector. In this case, FIG. 4*b* shows, by means of arrows, the flow of the fuel proceeding from the fuel supply line to the blow-in cap. Furthermore, the necessary movement of the components out of their respective closed position, which is required for establishing the fluid connection between the fuel supply line and the blow-in cap, is highlighted by arrows. It can be seen that the armature is raised out of its closed position on account of energization of the coil, which results in the fuel, which is under high pressure, pushing the tappet of the passive valve out of its closed position. If a corresponding movement of the components has taken place, the fuel, which is under high pressure, can flow out of the injector 1, from the fuel supply line to the blow-in cap.

Figure 5:
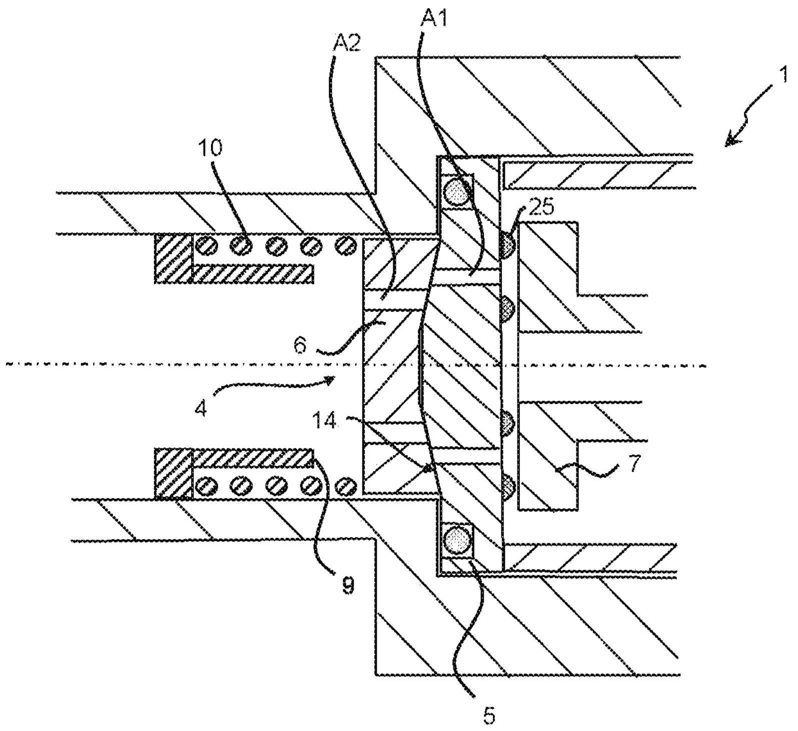
FIG. 5: is a schematic partial sectional view of an injector according to the invention, according to a second embodiment, in a closed state.

FIG. 5 is a schematic partial sectional view of an injector according to the invention, according to a second embodiment, in a closed state. Corresponding shaping of the tappet 6 and the underside of the valve plate 5 is visible, such that the seal, produced by pushing the tappet 6 onto the underside of the valve plate 5, is implemented by a conical sealing seat or a spherical sealing seat. An advantage of this is that these types of sealing seats allow for reliable sealing and are low-wear.

Figure 6:
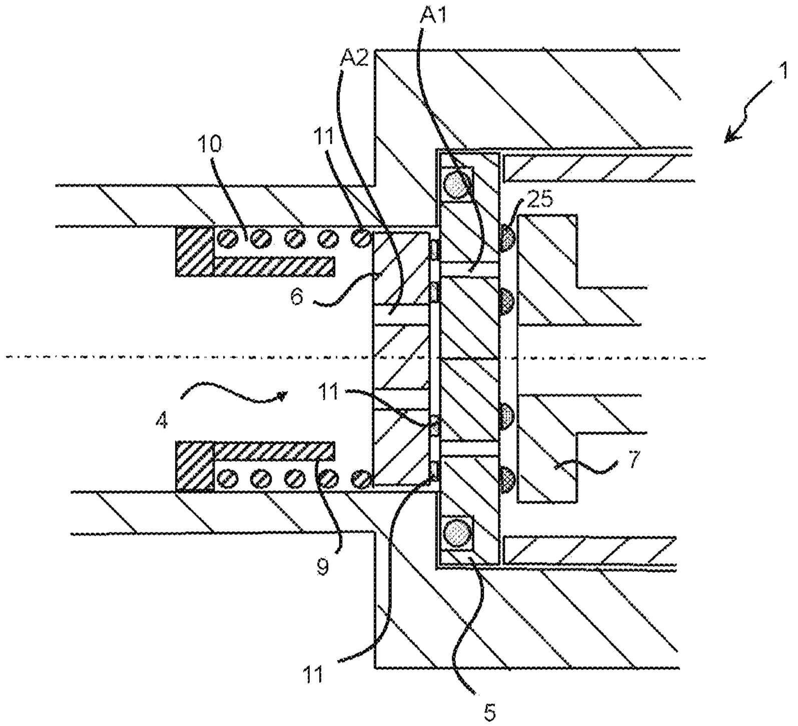
FIG. 6: is a schematic partial sectional view of the injector according to the invention, according to a third embodiment, in a closed state.

FIG. 6 shows a further embodiment of the present invention, in which an intermediate element 11 is arranged in the intermediate region between the tappet 6 and the valve plate 5, which intermediate element preferably covers or surrounds a contour of the at least one passage A1 of the valve plate 5 that faces towards the tappet 6. In this case, it can be provided that the intermediate element 11 is made of a flexible material, in order to damp an impact of the tappet 6 in the case of a movement in the direction of the valve plate 5. In this case, an elastomer lends itself as an implementation, by way of example, for the flexible material, which elastomer has very good damping properties.

Alternatively, or in addition to the embodiment as flexible material, it can also be provided that the intermediate element 11 has a thermally insulating property or comprises a thermally insulating material or consists of said material. Furthermore, the intermediate element can also be a coating that is applied to the tappet 6 and/or the valve plate 5, wherein alternatively thereto, however, it is also possible for the intermediate element 11 to be arranged so as to be freely movable in the intermediate space, between the tappet 6 and the valve plate 5.

Providing the intermediate element 11 is advantageous in particular with respect to the fatigue strength of the sealing connection between the tappet 6 and the valve plate 5 and protects the components which are typically subjected to high load in the case of impact between the tappet 6 and the valve plate 5.

Figure 7:
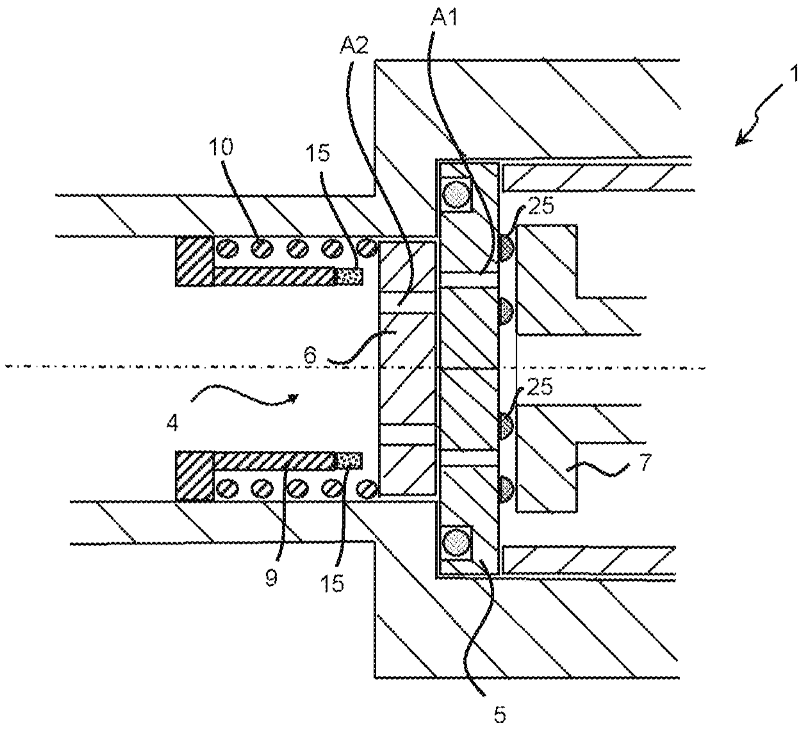
FIG. 7: is a schematic partial sectional view of the injector according to the invention, according to a fourth embodiment, in a closed state.

FIG. 7 shows a further modification of the concept according to the invention, in which the mating stop 9, which defines the maximum stroke of the tappet 6 away from the valve plate 5, comprises a damping element 15. Said damping element 15 is arranged on the mating stop 9 in such a way that a tappet 6 moving towards the mating stop 9 is damped by the damping element 15 before its movement is completely stopped. This reduces the bouncing of the tappet 6 when opening the passive valve 4, wherein furthermore the high material loading, associated with the bouncing, are also reduced on account of the damping element 15.

It is clear to a person skilled in the art that the various embodiments of the present invention explained in the figures can be combined with one another in part or completely.

LIST OF REFERENCE CHARACTERS

1 injector
2 fuel supply line
3 active valve
4 passive valve
5 valve plate
6 tappet/valve insert
7 armature
8 coil
9 mating stop
10 spring element 11 intermediate element
12 magnetic field lines
13 flat seal/flat seat
14 conical sealing seat/spherical sealing seat
15 damping element
16 housing cover
17 armature spring
18 pole tube
19 armature mating piece
20 bypass
21 magnetic yoke
22 air gap
23 armature base
24 armature guide/needle guide
25 sealing element
26 blow-in pipe
27 valve guide
28 blow-in cap
A1 passage of the valve plate
A2 passage of the tappet
A3 passage of the blow-in cap

The invention claimed is:

1. Injector for injecting fuel, comprising:

a fuel supply line for introducing a gaseous fuel, an active valve which is actively switchable and is designed to close or release at least one passage on a first side of a valve plate, in order to selectively release or interrupt a flow connection from the fuel supply line to a region downstream of the first side of the valve plate, and a passive valve which is arranged downstream of the valve plate and is switchable passively into a closing or releasing state by different pressure ratios prevailing upstream and downstream of the passive valve, wherein the passive valve is designed to close or release the at least one passage on a second side of the valve plate facing away from the first side with a tappet, in order to selectively release or interrupt a flow connection between the second side of the valve plate and a region downstream of the passive valve, and wherein in a closed state of the active valve an armature of the active valve that is movable back and forth is in contact with the first side of the valve plate, in order to seal the at least one passage of the valve plate.

2. Injector according to claim 1, wherein in a closed state of the passive valve the tappet of the passive valve, which is movable back and forth, is in contact with the second side of the valve plate, in order to seal the at least one passage of the valve plate.

3. Injector according to claim 2, wherein in the closed state of the passive valve the tappet is directly in contact with the second side of the valve plate or indirectly in contact therewith via an intermediate element.

4. Injector according to claim 1, wherein in the closed state of the active valve the armature is directly in contact with the first side of the valve plate or is indirectly in contact therewith via an intermediate element.

5. Injector according to claim 1, wherein a stop of the tappet that contacts the valve plate is designed, together with the second side of the valve plate, as a flat seal, a conical seal and/or a spherical seal.

6. Injector according to claim 1, further comprising a pushing device which is designed to push the tappet of the passive valve towards the valve plate, into a closed position.

7. Injector according to claim 6, wherein the pushing device comprises a spring element.

8. Injector according to claim 1, wherein a counter stop that limits the maximum stroke of the tappet from the valve plate is provided.

9. Injector according to claim 1, wherein the injector further comprises a coil which is designed to move the armature out of its closed position by means of magnetic force.

10. Internal combustion engine having fuel injection, having direct gas injection, comprising an injector according to claim 1.

11. Injector for injecting fuel, comprising:

a fuel supply line for introducing a gaseous fuel, an active valve which is actively switchable and is designed to close or release at least one passage on a first side of a valve plate, in order to selectively release or interrupt a flow connection from the fuel supply line to a region downstream of the first side of the valve plate, and a passive valve which is arranged downstream of the valve plate and is switchable passively into a closing or releasing state by different pressure ratios prevailing upstream and downstream of the passive valve, wherein the passive valve is designed to close or release the at least one passage on a second side of the valve plate facing away from the first side with a tappet, in order to selectively release or interrupt a flow connection between the second side of the valve plate and a region downstream of the passive valve, and wherein an intermediate element is arranged between the tappet and the valve plate, which element, in a closed position of the passive valve, is contacted on one side by the tappet and on a side opposite thereto by the valve plate.

12. Injector according to claim 11, wherein the intermediate element is made of a flexible material in order to reduce bouncing of the tappet in the case of an impact on the valve plate.

13. Injector according to claim 11, wherein the intermediate element is made of a flexible material that comprises a ceramic or is made of a ceramic.

14. Injector according to claim 11, wherein the intermediate element comprises or is a coating arranged on the end face of the tappet facing the valve plate, and/or comprises or is a coating arranged on the end face of the valve plate facing the tappet.

15. Injector according to claim 11, wherein the intermediate element is fastened on the tappet and/or the valve plate, or is arranged so as to be freely movable between the tappet and the valve plate.

16. Injector for injecting fuel, comprising:

a fuel supply line for introducing a gaseous fuel, an active valve which is actively switchable and is designed to close or release at least one passage on a first side of a valve plate, in order to selectively release or interrupt a flow connection from the fuel supply line to a region downstream of the first side of the valve plate, and a passive valve which is arranged downstream of the valve plate and is switchable passively into a closing or releasing state by different pressure ratios prevailing upstream and downstream of the passive valve, wherein the passive valve is designed to close or release the at least one passage on a second side of the valve plate facing away from the first side with a tappet, in order to selectively release or interrupt a flow connection between the second side of the valve plate and a region downstream of the passive valve, and wherein a counter stop is provided with at least one damping element, in order to damp an impact of the tappet and reduce bouncing.

* * * * *